July 4, 1961 G. A. WAHLMARK 2,990,784
HYDRAULIC APPARATUS
Filed Sept. 26, 1958 2 Sheets-Sheet 1
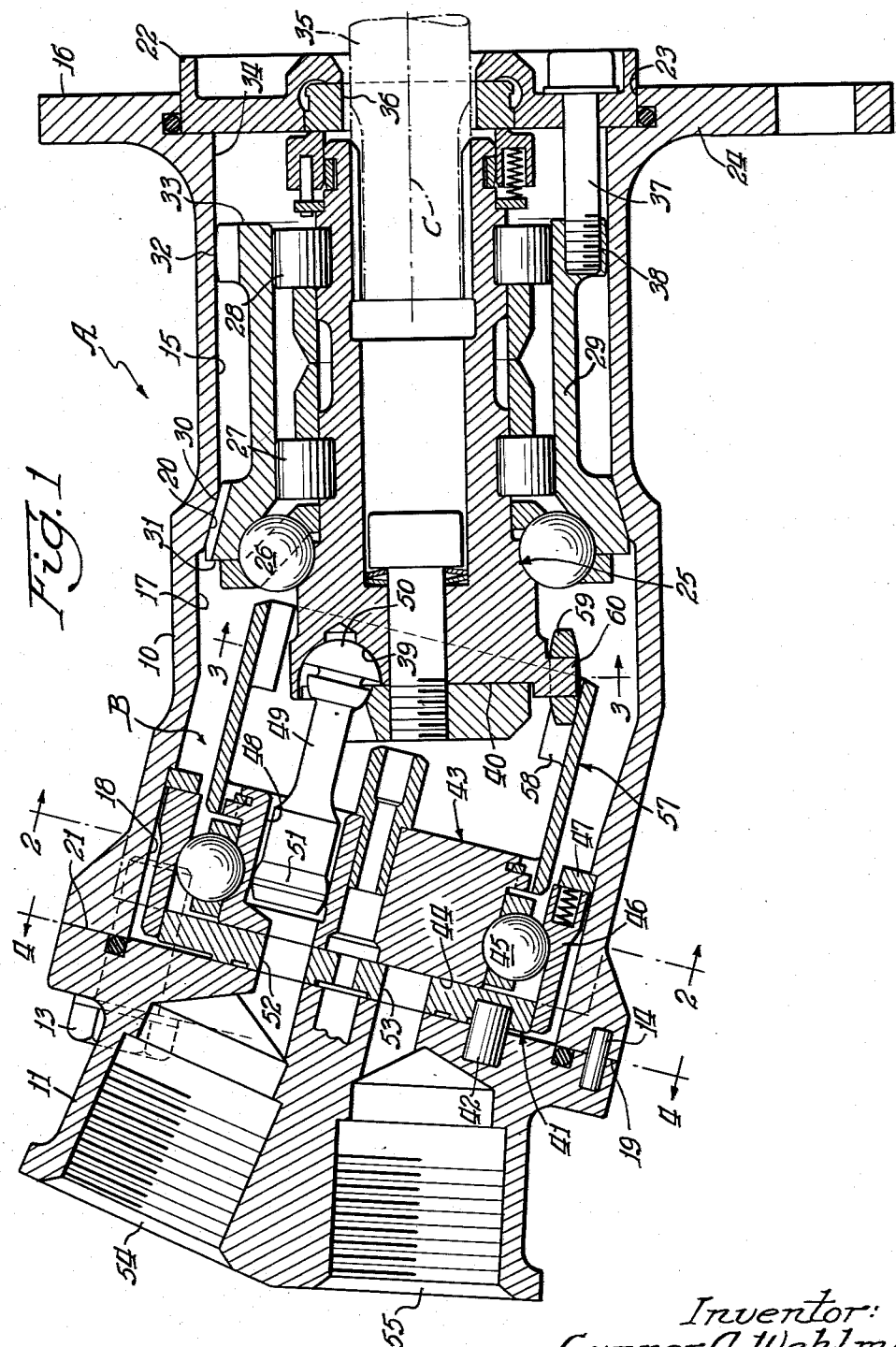
Inventor:
Gunnar A. Wahlmark
By: Frank C. Parker Atty

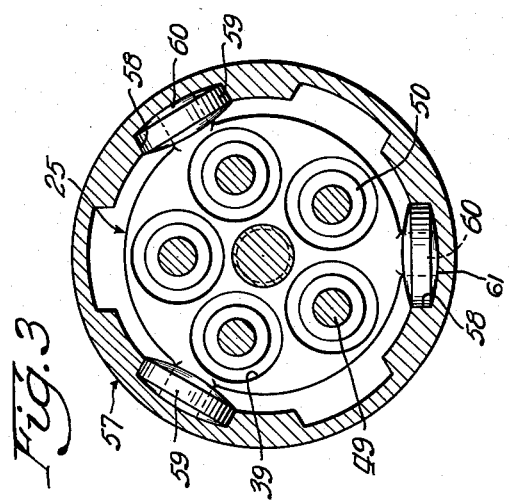
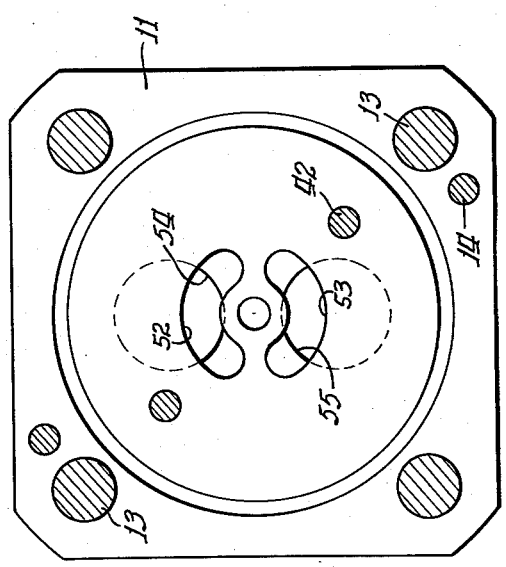
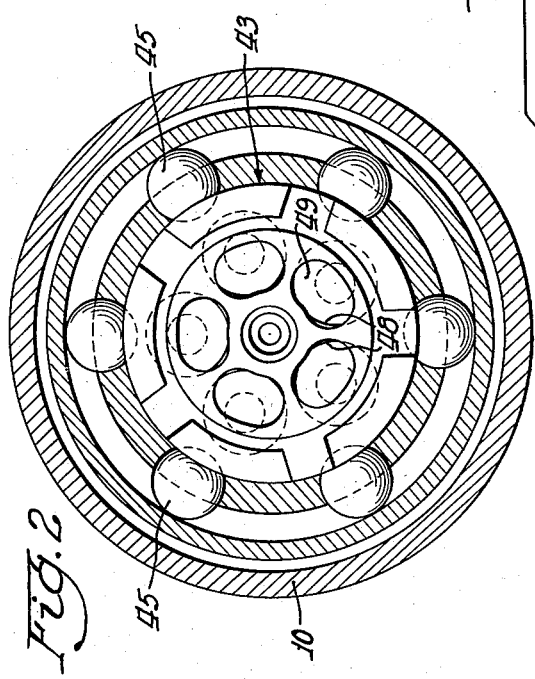

United States Patent Office 2,990,784
Patented July 4, 1961

2,990,784
HYDRAULIC APPARATUS
Gunnar A. Wahlmark, Rockford, Ill., assignor to Borg-Warner Corporation, Chicago, Ill., a corporation of Illinois
Filed Sept. 26, 1958, Ser. No. 763,639
2 Claims. (Cl. 103—162)

This invention relates to a hydraulic apparatus, such as a hydraulic pump or motor, and in particular, to an improved piston-type hydraulic pump or motor having bearing means for rotatably supporting a piston carrying, input or output member in the housing, the bearing means being maintained in proper alignment against the housing at all times regardless of subsequent wear between the operating parts thereof or relative expansion of certain of the operating parts through heating thereof, and having means for interconnecting the rotatable input or output member with a rotatable cylinder block having a compact cluster of cylinders formed therein and being angularly disposed relative to the rotatable member whereby the rotatable input or output member is adapted to cause rotation of the cylinder block.

It is well known in the art to construct hydraulic pumps or motors having a plurality of fluid displacing pistons adapted to be reciprocated respectively in a plurality of cylinders formed in a rotatable cylinder block supported within a cavity formed in the housing. The pistons are, in turn, interconnected with a rotatable member, angularly disposed relative to the cylinder block, whereby reciprocation of the pistons (in the case of a hydraulic motor) causes rotation of the output member relative to the housing, or upon rotation of the input member (in the case of a hydraulic pump), the input member causes the pistons to reciprocate within the respective cylinders in the cylinder block to thereby draw fluid into the cylinders from an inlet, pressurize the same, and force the pressurized fluid out through an outlet formed in the housing. The rotatable input or output member is interconnected with a shaft projecting through the housing, the shaft functioning as a power output shaft when the device is utilized as a hydraulic motor and functioning as an input shaft when the device is utilized as a hydraulic pump.

It is also well known in the art to support the rotatable input or output member by bearing means disposed between the rotatable member and the housing. However, since the bearing races are formed from a different material than the material forming the housing and the other elements of the hydraulic apparatus, it has been found in practice that subsequent expansion of the various elements upon heating of the hydraulic apparatus is not uniform and thereby results in misalignment or relative movement of the parts, particularly the bearing means, during the operation of the hydraulic apparatus. Further, subsequent wear between the parts also causes misalignment and relative movement of the parts. This, of course, results in a loss of the efficiency of the apparatus and various maintenance problems.

It is, therefore, an object of this invention to provide an improved bearing means for a hydraulic apparatus whereby the bearing means is maintained in alignment relative to the housing regardless of subsequent heating or wear of the various parts of the hydraulic apparatus.

It is another object of this invention to provide an improved bearing means for a hydraulic piston-type pump or motor, the bearing means being properly positioned relative to the housing throughout various operating conditions of the hydraulic apparatus by the force of the fluid pressure acting against the pistons which are operatively interconnected with the bearing means.

Another object of this invention is to provide in combination, a housing having an internal tapered surface formed therein and a bearing sleeve having an external tapered surface formed thereon and disposed in the housing whereby the tapered surfaces are adapted to be placed in engagement to thereby position the bearing sleeve relative to the housing.

A further object of this invention is to provide in the combination set forth in the preceding object, fluid pressure means disposed in the housing and operatively interconnected with the bearing sleeve whereby the force of the fluid pressure tends to maintain the tapered surfaces in engagement.

It has also been found that when constructing a hydraulic pump or motor of the type previously described, some means must be provided to operatively interconnect the rotatable input or output member with the rotatable cylinder block in order to cause rotation of the cylinder block when the input or output member is rotated to thereby eliminate torsional stress on the pistons. The prior practice has been to provide a suitable driving link between the rotatable input or output member and the cylinder block, the link interconnecting the central portions of the cylinder block and the input or output member. However, it has been found that in order to connect the link to the central portion of the cylinder block, the cylinders cannot be arranged in a compact cluster, and thus the entire structure of the apparatus must be made larger than normal to accommodate the interconnecting link.

Therefore, it is another object of this invention to provide an improved hydraulic apparatus comprising a cylinder block, a rotatably and angularly disposed input or output member carrying a plurality of pistons which are adapted to be respectively received in a plurality of cylinders formed in a compact arrangement in the cylinder block, and means interconnecting the rotatable member to the cylinder block to cause rotation of the cylinder block upon rotation of the rotatable member.

Other and more particular objects, advantages, and uses of this invention will become apparent from a reading of the following specification taken in connection with the accompanying drawings forming a part thereof and wherein:

FIGURE 1 illustrates, in an axial cross-sectional view, a piston-type hydraulic apparatus formed in accordance with the teachings of this invention.

FIGURE 2 is a cross-sectional view taken on line 2—2 of FIGURE 1 and illustrates a cylinder block disposed in the hydraulic apparatus.

FIGURE 3 is a cross-sectional view taken on line 3—3 of FIGURE 1 and illustrates means interconnecting a rotatable input or output member with the rotatable cylinder block of the hydraulic apparatus.

FIGURE 4 is a cross-sectional view taken on line 4—4 of FIGURE 1 and illustrates an inlet and an outlet formed in the housing of the hydraulic apparatus.

Reference is now made to the accompanying drawings where like reference letters and numerals are used throughout to designate like parts where appropriate and particular reference is made to FIGURE 1 illustrating a hydraulic apparatus, generally indicated by the reference letter A, comprising a plurality of housing sections 10 and 11 suitably fastened together by a plurality of bolts 13 and locating pins 14.

The housing section 10 is provided with a cylindrical bore 15 interrupting an end 16 of the housing section 10 and interconnecting with a larger cylindrical bore 17 formed medially in the housing section 10. A cylindrical bore 18 interrupts another end 19 of the housing section 10 and angularly interconnects the cylindrical bore 17 for a purpose later to be described. The housing section 10 is provided with an internal tapered or frusto-conical surface 20 at the juncture of the bores 15 and 17.

The housing section 11 is provided with a substantially flat end surface 21 which closes off the bore 18 formed in the housing section 10 when the housing sections 10 and 11 are assembled together. The other end 16 of the housing section 10 is closed off by an end plate 22 which is received in a counter bore 23 formed in an outwardly projecting flange portion 24 provided at the end 16 of the housing section 10. The housing section 11 and end plate 22 are suitably sealed against the respective ends 19 and 16 of the housing section 10 to provide a cavity B therein, the cavity B being defined by the interconnected bores 15, 17, and 18.

An input or output member 25 is disposed within the cavity B and is rotatably supported therein by a plurality of roller elements 26, 27, and 28 in the following manner. A hollow bearing sleeve member 29, having an external tapered or frusto-conical surface 30 at one end 31 thereof and an external arcuate surface 32 at another end 33 thereof, is disposed within the cavity B. The tapered surface 30 of the sleeve member 29 is adapted to engage the tapered surface 20 of the housing section 10, and the arcuate surface 32 of the sleeve member 29 is adapted to engage an internal peripheral or cylindrical surface 34 of the housing section 10, the cylindrical surface 34 being defined by the bore 15, whereby the bearing sleeve 29 is properly aligned within the housing section 10. The arcuate surface 32 formed on the bearing sleeve 29 may be defined as being superimposed upon a segment of a sphere having a diameter substantially equal in length to the diameter of the bore 15. In this manner the sleeve member 29 may be readily inserted within the bore 15 without interference between the internal peripheral surface 34 of the housing section 10 and the arcuate surface 32 of the sleeve member 29 as the cylindrical surface 34 tangentially engages the arcuate surface 32 regardless of any slight misalignment between the housing section 10 and the sleeve member 29. The sleeve member 29 forms an outer fixed race for the roller elements 26, 27, and 28 disposed between the sleeve member 29 and the rotatable input or output member 25 whereby the input or output member 25 is rotatably supported within the housing section 10.

The rotatable member 25 is adapted to be suitably connected to a shaft 35 projecting through an aperture 36 formed in the end plate 22 whereby the free end of the shaft 35 is adapted to be connected to a drive or driven member (not shown). The sleeve member 29 is also adapted to be secured to the housing section 10 by a plurality of bolts 37 projecting through the end plate 22 respectively received within threaded bores 38 formed in the end 33 of the sleeve member 29.

The rotatable input or output member 25 is provided with a plurality of hemispherical sockets 39 formed in circular array in a flat end surface 40 of the member 25.

A flat valve plate 41, disposed within the cavity B, is adapted to sealably engage the flat surface 21 of the housing section 12 and is secured thereto by a plurality of pins 42. A rotatable cylinder block 43 having a flat end surface 44 thereof is disposed in sealing engagement against the valve plate 41 and is rotatably supported within the housing section 10 by bearing means 45 disposed between the cylinder block 43 and a hollow cylindrical member 46 telescopically disposed about the valve plate 41 and fixed within the housing section 10 by a snap ring 47.

The cylinder block 43 is provided with a plurality of cylinders 48 disposed in circular array (FIG. 2) about the block 43 and respectively receive a plurality of pistons 49 therein. The pistons 49 each have an enlarged hemispherical end 50 respectively received in one of the sockets 39 formed in the rotatable input or output member 25. The pistons 49 each have an enlarged valve head 51 adapted to be reciprocated within a respective cylinder 48 in a manner later to be described.

The valve plate 41 is provided with a pair of kidney-shaped openings 52 and 53 (FIG. 4) adapted to be in fluid communication with certain of the cylinders 48 formed in the cylinder block 43. The opening 52 is also in fluid communication with an inlet 54 formed in the housing section 11 and the opening 53 is in fluid communication with an outlet 55 formed in the housing section 11.

A tubular member 57 is fastened to the rotatable cylinder block 43 and projects therefrom encompassing the pistons 49. The tubular member 57 is provided with a plurality of slots 58 (FIG. 3) adapted to respectively receive a plurality of rollers 59 rotatably supported on pinions 60 carried by the rotatable input or output member 25. As previously stated, the cylinders 48 are formed in the cylinder block 43 in a compact cluster, the walls of the cylinder block 43 between adjacent cylinders 48 being adapted to only withstand the force of the fluid pressure in the respective cylinders 48. Therefore, the central portion of the cylinder block 43 is not adapted to be interconnected with the rotatable member 25 in a manner common in the art. However, by interconnecting the cylinder block 43 to the rotatable member 25 by the tubular member 57 and rollers 60, it can be seen that the cylinders 48 can be arranged as close together as possible to thereby provide a compact arrangement and reduce the overall size of the hydraulic apparatus A.

The operation of the hydraulic apparatus A when utilized as a hydraulic motor will now be described, it being understood that a hydraulic motor and a hydraulic pump operate in substantially the same manner.

Fluid from a source of fluid pressure (not shown) is conveyed to the inlet 54 and passes through the kidney-shaped opening 52 in the valve plate 41 into those cylinders 48 in fluid communication therewith whereby the force of the fluid pressure within the cylinders 48 act against the respective valve heads 51 of the pistons 49 and cause the same to move axially, outwardly therefrom. As the pistons 49 are moved to the right, as viewed in the drawings, by the force of the fluid pressure in the respective cylinders 48, the ends 50 thereof cause rotation of the output member 25. When the pistons 49 moving to the right have reached top dead center, further rotation of the member 25 by the other pistons 49 performing their respective power strokes causes the pistons which have reached top dead center to move to the left within the respective cylinders 48 because of the angular relation between the cylinder block 43 and the output member 25. The pistons 49 moving to the left force the fluid within the respective cylinders 48 out through the kidney-shaped opening 53 in the valve plate 41 into the outlet 55 formed in the housing section 12.

It can be seen that upon rotation of the output member 25, the rollers 59 carried thereby cause rotation of the cylinder block 43 as the rollers 59 are drivingly connected to the tubular element 57 by the slots 58. As each roller 59 is rotated about an axis of rotation C of the output member, the rollers 59 rotate on the respective stub shafts 60 and move axially within the slots 58 as each roller 59 is rotated toward the top of the housing section 10, as viewed in the drawing. As shown in FIGURES 1 and 3, the rollers 59 are formed with an arcuate outer surface 61 permitting the rollers 59 to move axially within the respective slots 58 without excessive frictional interference. Rotation of the cylinder block 43 by the output member 25, in the manner previously described, permits the cylinders 48 to be sequentially moved from fluid communication with the inlet opening 52 to fluid communication with the outlet opening 53 in a manner well known in the art. The force of the fluid pressure acting against the pistons 49 thus causes rotation of the output member 25 and the output shaft 35 connected therewith thereby driving a device (not shown) connected to the free end of the shaft 35.

It can be seen that the force of the pressure fluid conveyed to the cylinders 48 and acting against the ends 51 of the respective pistons 49 tends to cause axial movement of the pistons 49, valve member 25, roller elements 26, 27, and 28, and sleeve member 29 to the right. This thrust load imposed upon the bearing sleeve member 29 tends to maintain the tapered surface 30 thereof in sealing engagement with the tapered surface 20 of the housing section 10 during operation of the hydraulic apparatus A. Therefore, any wear or relative expansion between the housing section 10 and the sleeve member 29 or other parts of the hydraulic apparatus A during subsequent heating of the apparatus A will not effect the positioning of the sleeve member 29 relative to the housing section 10 as the fluid pressure in the cylinders 48 tends to urge the tapered surfaces 30 and 20 into engagement.

When the hydraulic apparatus A is operating as a fluid pump, the inlet 54 is adapted to communicate fluid from a source (not shown) to the opening 52 in the valve plate 41. Upon rotation of the shaft 35 by a suitable power source (not shown) the input member 25 will be rotated thereby carrying the pistons 49 in rotation therewith. As the input member 25 is rotated by the shaft 35, it can be seen, as previously described, that the rollers 59 carried thereby cause rotation of the cylinder block 43. Because the input member 25 is angularly disposed relative to the cylinders 48 and cylinder block 43, the pistons 49 reciprocate within the respective cylinders 48 and thereby draw fluid into the cylinders 48 in communication with the opening 52 in the valve plate 41, pressurize the fluid, and force the same out through the opening 53 in the valve plate 41 when the respective cylinders come into communication therewith whereby the pressurized fluid is delivered from the hydraulic apparatus A out through the outlet 55 to a utilization means (not shown). The force of the pressurized fluid in the cylinders 48 tends to cause axial movement of the respective pistons 49, input member 25, roller elements 26, 27, and 28, and bearing sleeve member 29 to the right in the same manner previously described thereby tending to maintain the tapered surface 30 of the sleeve member 29 in engagement with the tapered surface 20 of the housing section 10.

By forming the tapered surfaces 20 and 30 at an angle relative to the axis C of rotation of the input or output member 25, the force of the fluid pressure in the cylinders 48 tending to axially move the bearing sleeve member to the right permits the tapered surface 30 of the bearing sleeve member 29 to move into engagement with the tapered surface 20 of the housing section 10 taking up any clearance space therebetween to thereby maintain the sleeve member 29 in engagement with the housing section 10 regardless of slight changes in the size of the operating parts resulting from wear or expansion thereof. If the surfaces 20 and 30 were not tapered, the sleeve member 29 would tend to tip within the housing section 10 upon subsequent changes in the sizes of the parts providing a slight clearance space between the housing section 10 and the sleeve member 29. It can readily be seen that if a clearance space were created between the sleeve member 29 and the housing section 10 by wear of the parts or uneven expansion thereof during heating of the structures, the thrust force imposed by the pistons 49 against the input or output member 25 is offset relative the axis C thereof and would tend to tip the sleeve member 29 within the housing. However, since the tapered surfaces 20 and 30 permits the sleeve member 29 to be moved axially relative to the housing section 10 by the force of the fluid pressure when a clearance space is created therebetween, the tapered surface 30 of the sleeve member 29 is subsequently wedged into engagement with the tapered surface 20 of the housing section 10 thereby taking up any clearance space or play therebetween.

It can be seen that there has been described a piston-type hydraulic apparatus which is adapted to have the bearing means supporting a rotatable input or output member maintained in proper alignment with the housing of the apparatus during all operating conditions thereby by the force of fluid pressure present in the cylinders acting against the pistons of the apparatus. It can be further seen that there has been described a piston-type hydraulic apparatus whereby the rotatable input or output member interconnected with the pistons is adapted to cause rotation of the cylinder block without subjecting the pistons to any adverse rotational forces and without requiring the pistons and cylinders to be arranged in a non-compact cluster.

While this invention has been disclosed in connection with a specific embodiment thereof, it is to be understood that this was by way of example rather than limitation, and it is intended that the invention be defined by the appended claims.

What is claimed is:

1. A hydraulic apparatus comprising: a housing having a cavity therein; a rotatable cylinder block mounted in said cavity, said cylinder block having a plurality of cylinders adapted to receive fluid therein; a plurality of reciprocable pistons respectively disposed in said cylinders; a rotatable member disposed in said cavity and spaced from said cylinder block, said member being interconnected with said pistons whereby said member and said block rotate as said pistons reciprocate; means defining an internal tapered surface in said housing; means defining a tubular element projecting from said cylinder block and encompassing said pistons; means defining slot means in said tubular element; means defining at least one roller on said member adapted to be received in said slot means whereby rotation of said member causes rotation of said cylinder block; a bearing sleeve having an external tapered surface and disposed in said cavity whereby said tapered surfaces are adapted to be placed in engagement to position said sleeve relative to said housing; and bearing means disposed between said sleeve and said rotatable member to rotatably support said member in said housing whereby the force of said fluid in said cylinders acting against said pistons tends to axially move said pistons, rotatable member, bearing means and sleeve relative to said housing to maintain said tapered surfaces in engagement.

2. A hydraulic apparatus comprising: a housing having a cavity therein; a rotatable cylinder block mounted in said cavity, said cylinder block having a plurality of cylinders adapted to receive fluid therein; a plurality of reciprocable pistons respectively disposed in said cylinders; a rotatable member disposed in said cavity and angularly disposed with respect to said cylinder block, said member being interconnected with said pistons whereby said member and said block rotate as said pistons reciprocate; means defining an internal tapered surface in said housing; means defining a tubular element projecting from said cylinder block and encompassing said pistons; means defining a plurality of slots in said tubular element; means defining a plurality of rollers on said member adapted to be respectively received in said slots whereby said rollers upon rotation of said member causes rotation of said cylinder block and are adapted to move axially in said slots; a bearing sleeve having an external tapered surface and disposed in said cavity whereby said tapered surfaces are adapted to be placed in engagement to position said sleeve relative to said housing; and bearing means disposed between said sleeve and said rotatable member to rotatably support said member in said housing whereby the force of said fluid in said cylinders acting against said pistons tends to axially move said pistons, rotatable member, bearing means and sleeve relative to said housing to maintain said tapered surfaces in engagement.

References Cited in the file of this patent

UNITED STATES PATENTS

| | | |
|---|---|---|
| 225,651 | Silver | Mar. 16, 1880 |
| 1,203,165 | Williams et al. | Oct. 31, 1916 |
| 1,467,378 | Hanson | Sept. 11, 1923 |
| 1,865,950 | Petskeyes | July 5, 1932 |
| 1,904,395 | Whitehead | Apr. 18, 1933 |
| 1,924,937 | Leister | Aug. 29, 1933 |
| 1,931,969 | Thoma | Oct. 24, 1933 |
| 1,968,925 | Barish | Aug. 7, 1934 |
| 1,996,889 | Thomas | Apr. 9, 1935 |
| 2,649,741 | Henrichsen | Aug. 25, 1953 |
| 2,852,320 | Cornelius | Sept. 16, 1958 |
| 2,862,456 | Bauer | Dec. 2, 1958 |

FOREIGN PATENTS

| | | |
|---|---|---|
| 132,836 | Sweden | Sept. 4, 1951 |
| 463,045 | Italy | Apr. 12, 1951 |